United States Patent [19]
Baba

[11] Patent Number: 4,619,105
[45] Date of Patent: Oct. 28, 1986

[54] MOWING APPARATUS
[75] Inventor: Toru Baba, Yokosuka, Japan
[73] Assignee: Kioritz Corporation, Tokyo, Japan
[21] Appl. No.: 697,783
[22] Filed: Feb. 4, 1985
[30] Foreign Application Priority Data Feb. 7, 1984 [JP] Japan .................... 59-15885

[51] Int. Cl.⁴ ................. A01D 34/84; F16B 35/06
[52] U.S. Cl. .................................. 56/12.7; 30/276; 411/403
[58] Field of Search .............. 56/12.7; 411/403–406; 30/276

[56] References Cited

U.S. PATENT DOCUMENTS

| 3,161,450 | 12/1964 | Goodenough | 411/911 |
| 3,178,988 | 4/1965 | Borup | 411/403 |
| 3,253,625 | 5/1966 | Oestereicher | 411/403 |
| 3,673,912 | 7/1972 | Herr | 411/403 |
| 4,152,832 | 5/1979 | Akaika et al. | 56/12.7 |
| 4,172,322 | 10/1979 | Ballas | 56/12.7 |
| 4,236,311 | 12/1980 | Mitchell | 56/12.7 |
| 4,285,265 | 8/1981 | Rieper | 411/405 |

FOREIGN PATENT DOCUMENTS

| 1170555 | 1/1959 | France | 411/403 |
| 46-46/71 | 1/1971 | Japan | 411/403 |

Primary Examiner—Paul J. Hirsch
Attorney, Agent, or Firm—Browdy and Neimark

[57] ABSTRACT

A mowing apparatus including a connecting member for connecting a casing from below to a drive shaft. The connecting member has a head formed with a groove on its surface, and an elevated portion is formed along the groove and located anterior to the groove with respect to the direction of rotation of the casing.

3 Claims, 5 Drawing Figures

MOWING APPARATUS

BACKGROUND OF THE INVENTION

This invention relates to mowing apparatus, and more particularly it is concerned with a mowing apparatus having an improved connecting member for connecting a rotary casing for containing a cutter.

When a casing for containing a cutter is assembled or mounted to a drive shaft for connecting the casing to a power source, it has hitherto been usual practice to use a bolt or nut which is attached to the underside of the casing for connecting the casing to the drive shaft. When a nut is used, the nut is usually made large in size and tightened or loosened manually without using a tool. The underside of the casing is generally brought into contact with the ground and a rotating force is exerted thereon by the rotating casing during mowing operations, so that the nut tends to be further tightened and it may sometimes become impossible to manually loosen it when the need arises. This would make mowing operations troublesome. Thus, to facilitate assembling and disassembling of the casing, a bolt is favored in place of the nut as means for connecting the casing to the drive shaft. However, the use of a bolt is not without a problem. When a bolt is used, its head is brought into contact with the ground when mowing operations are performed, and a groove formed in the head of the bolt in which a driver or coin can be inserted to turn the bolt might be clogged with cut grass, sand or trash, thereby interfering with the use of a driver or coin to turn the bolt.

SUMMARY OF THE INVENTION

This invention has been developed for the purpose of obviating the aforesaid problem of the prior art. Accordingly, the invention has as its object the provision of a mowing apparatus having an improved connecting member capable of preventing the groove formed in the head of the connecting means from being clogged with trash and enabling the rotary casing to be assembled with ease.

The outstanding characteristic of the invention enabling the aforesaid object to be accomplished is that, in a mowing apparatus having a casing containing a cutter and rotated in a predetermined direction which is connected to the drive shaft from below by connecting member having a grooved head, the head of the connecting member is formed with an elevated portion on its surface disposed along the groove extending diametrically through the center of the head and located anterior to the groove with respect to the direction of rotation of the casing.

The constituent feature of the invention that the head of the connecting member is formed with an elevated portion disposed along the groove and located anterior to the groove with respect to the direction of rotation of the casing offers an advantage in that it makes it possible to prevent the groove formed in the head of the connecting member from being clogged with trash during mowing operations and facilitates mounting and removing the rotary casing to the drive shaft. The need to provide a cover or other means for preventing the groove from being clogged with trash is eliminated, so that it is possible to obtain an overall compact size and a light weight in a mowing apparatus.

DETAILED DESCRIPTION OF THE PREFERRED EMBODIMENT

Figure 1:
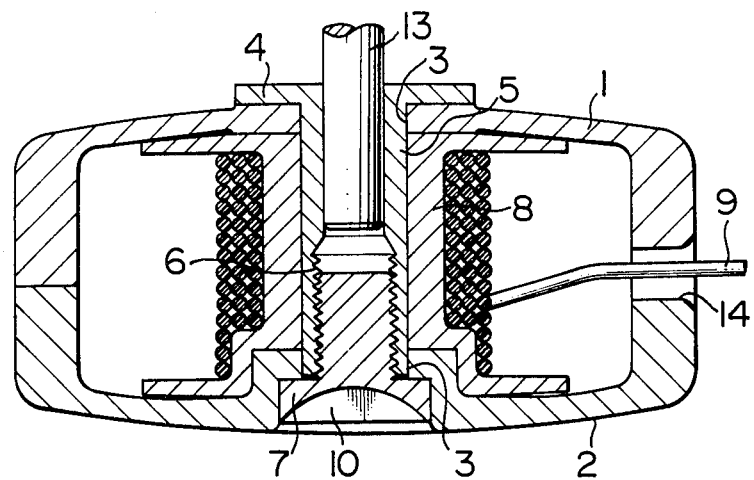
FIG. 1 is a vertical sectional view of the essential portions of the mowing apparatus comprising one embodiment of the invention.

Referring to FIG. 1, the mowing apparatus comprises an upper casing member 1 and a lower casing member 2 of a bowl shape assembled with their open ends facing each other to provide a casing defining a space for containing a nylon cord 9 serving as a mowing cutter. The upper and lower casing members 1 and 2 are formed with a through hole 3 which is coaxial with the axes of rotation of the casing members 1 and 2, and a boss 5 formed with a flange 4 at its upper end and secured to a drive shaft 13 having a shaft portion of a slightly smaller diameter than the hole 3 is inserted in the hole 3 from above. The boss 5 which has a length such that it is substantially brought into contact with a wall of the hole 3 disposed in the lower casing member 2 is formed with an internally threaded portion 6 in its lower section which extends axially. The section of the hole 3 disposed in the lower casing member 2 is formed with an increased diameter portion for receiving a head of a connecting member.

In the mowing apparatus of the aforesaid construction, a connecting member having a grooved head, namely a bolt 7, for example, is threadably fitted from below into the internally threaded portion 6 of the boss 5 in such a manner that the thread formed on the bolt 7 is oriented in a direction opposite to the direction of rotation of the casing. Thus, the casing members 1 and 2 are held between the flange 4 of the boss 5 and the head of the bolt 7 fitted in the increased diameter portion of the hole 3, and firmly secured to the drive shaft 13.

A spool 8 is mounted in the space defined by the casing members 1 and 2 for rotation coaxially with the casing. The spool 8 has upper and lower flanges defining a groove portion which has the nylon cord 9 serving as a cutter wound thereon. An end portion of the nylon cord 9 of a certain length is unwound and drawn out through a cord outlet opening 14 to outside.

The boss 5 or casing is connected through the drive shaft 13 to a power source, not shown. When a mowing operation is performed, the casing, spool 8 and nylon cord 8 rotate as a unit with the boss 5, so that the end portion of the nylon cord 9 drawn out from the outlet opening 14 cuts grass.

Figure 2A:
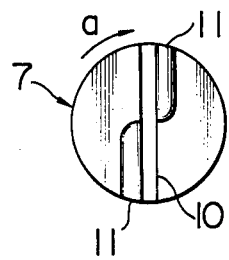
FIG. 2(A) is a fragmentary plan view of the mowing apparatus shown in FIG. 1.
Figure 2B:
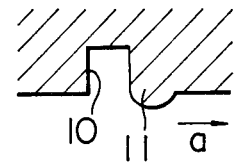
FIG. 2(B) is a fragmentary sectional view, on an enlarged scale, of the portion of the mowing apparatus shown in FIG. 2(A)

The underside of the lower casing member 2 is usually maintained in contact with the ground and moved while the mowing operation is being performed. The trouble that a groove formed in the surface of the head of the connecting member 7 for inserting a tool to tighten or loosen the connecting member 7 threadably fitted in the internally threaded portion 6 of the boss 5 is clogged with sand or grass might arise. To prevent such trouble, the invention provides an improvement in the connecting member 7. FIGS. 2(A) and 2(B) show one constructional form of the connecting member 7 in which an elevated portion 11 is formed along the groove 10 (formed on the surface of the head which is substantially circular to extend diametrically along the center and having a length substantially equal to the diameter of the head) and disposed anterior to the groove 10 with respect to the direction a of rotation of the casing. The provision of the elevated portion 11 avoids the entry of sand and grass into the groove 10, thereby satisfactorily preventing the groove 10 from being clogged with said or grass.

Figure 3A:
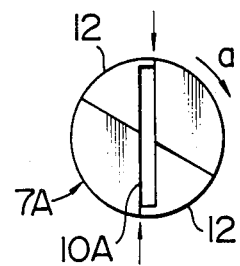
FIG. 3(A) is a plan view of another constructional form of the portion of the mowing apparatus shown in FIG. 2(A)
Figure 3B:
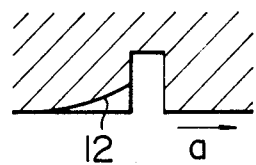
FIG. 3(B) is a fragmentary sectional view, on an enlarged scale, of the portion of the mowing apparatus shown in FIG. 3(A).

FIGS. 3(A) and 3(B) show another constructional form of the connecting member 7A in which a depressed portion 12 is formed along the groove 10A by cutting out one corner of the groove 10A and disposed posterior to the groove 10A with respect to the direction a of rotation of the casing, so that the portion of the head disposed anterior to the groove 10A has as a whole a greater height than the portion of the head disposed posterior to the groove 10A. The constructional form shown in FIGS. 3(A) and 3(B) achieves the same effect as the constructional form shown in FIGS. 2(A) and 2(B).

In the constructional forms shown in FIGS. 2(A) and 3(A), the elevated portion and depressed portion of the surface of the head are shown as being formed on both sides of the groove 10, 10A in positions substantially disposed on a diagonal line. This construction is the result of the connecting member 7 being connected to the drive shaft 13 in the center of the casing. When the connecting member 7 is in a position which is displaced from the center of rotation of the casing, the elevated portion and depressed portion may be formed only on one side of the groove 10, 10A.

What is claimed is:

1. A mowing apparatus comprising:
   a casing containing a cutter; and
   a connecting member having a head formed with a groove on its surface for inserting a tool to tighten or loosen said connecting member, said connecting member connecting said casing from below to a driveshaft to rotate the casing in a predetermined direction;
   wherein the improvement comprises:
   an anterior portion having a greater height than a posterior portion formed along said groove on the surface of the head of said connecting member with respect to the direction of rotation of the casing for preventing said groove from being clogged, the upper surface of said bolt head being generally planar, and said anterior portion having a greater height constituting an elongated rib extending upwardly from said generally planar surface along a portion of the edge of said groove.

2. A rotary mowing device including a casing containing a cutter, and a connecting member in the form of a bolt having a head formed with a groove therein for inserting a tool to tighten or loosen said bolt, said bolt connecting said casing from below to a drive shaft to rotate said casing in predetermined direction, whereby the groove on said head of said bolt projects downwardly,
   said bolt head comprising means for preventing the groove from becoming clogged with sand or grass, said means including an anterior portion of said bolt head having a greater height than a posterior portion formed along the groove with respect to the direction of rotation of the casing, the upper surface of said bolt head being generally planar, said anterior portion which has a greater height constituting an elongated rib extending upwardly from said generally planar surface along a portion of the edge of said groove.

3. A rotary mowing device according to claim 2 wherein said anterior portion which has a greater height further constitutes a second elongated rib, said elongated rib first mentioned extending from an edge of said bolt head along one edge of said groove to approximately the center of said bolt head, and said second elongated rib extending from an opposite edge of said bolt head along the opposite edge of said groove to approximately the center of said bolt head.

* * * * *